United States Patent [19]
Tillinger et al.

[11] 4,053,822
[45] Oct. 11, 1977

[54] SUBHARMONIC FREQUENCY GENERATOR

[75] Inventors: Herman Irving Tillinger, Morris Township; Ralph Walk, Randolph Township, both of Morris County, N.J.

[73] Assignee: Bell Telephone Laboratories, Incorporated, Murray Hill, N.J.

[21] Appl. No.: 753,713

[22] Filed: Dec. 23, 1976

[51] Int. Cl.$^2$ ............................................. H02M 5/16
[52] U.S. Cl. ...................................... 363/172; 336/160
[58] Field of Search ..................... 307/220; 321/60, 61; 321/68; 323/60, 61; 336/160

[56] References Cited

U.S. PATENT DOCUMENTS

| 2,377,180 | 5/1945 | Pohm | 323/61 X |
| 2,600,560 | 6/1952 | McMahon | 321/68 |
| 2,694,177 | 11/1954 | Sola | 323/60 |
| 2,870,398 | 1/1959 | Sola | 323/61 |
| 2,930,997 | 3/1960 | Fisher et al. | 336/160 |
| 3,048,765 | 8/1962 | Weppler | 321/68 X |
| 3,387,203 | 6/1968 | Munnelly | 321/68 |
| 3,447,068 | 5/1969 | Hart | 323/60 |

FOREIGN PATENT DOCUMENTS

| 692,068 | 8/1964 | Canada | 321/68 |

*Primary Examiner*—William M. Shoop
*Attorney, Agent, or Firm*—Alfred G. Steinmetz

[57] ABSTRACT

A static electromagnetic frequency changer utilizes linear inductances and capacitances and a saturable reactance to generate subharmonic frequencies. The magnetic components of the circuit are designed to be combined on a single magnetic structure. The frequency changer is rendered relatively insensitive to slight changes in the frequency and amplitude of the driving signal through the inclusion of a feedback winding.

10 Claims, 3 Drawing Figures

SUBHARMONIC FREQUENCY GENERATOR

BACKGROUND OF THE INVENTION

1. Field of the Invention

This invention relates to frequency converters and, more specifically, to static electromagnetic subharmonic frequency changers. It is specifically concerned with the generation of subharmonics in a frequency changer using a saturable reactor as a modulation device.

2. Prior Art

Static electromagnetic frequency changers, particularly those which divide frequencies, operate by generating subharmonic oscillations in a circuit including inductive and capacitive reactances. The major component of a static electromagnetic frequency changer is a nonlinear or saturable reactor which functions in a modulating mode. This saturable reactor is simultaneously energized by a low frequency signal and a high frequency signal which are related to each other by a predetermined functional relation. Normally the higher frequency signal is supplied by a sinusoidal driving source. The lower frequency signal is produced by a resonant circuit which is excited by the driving source. The saturable reactor acts as a mixer or modulator and produces a plurality of summation frequencies and sideband frequencies. It has been determined that the lower sideband frequency in such a system introduces negative impedance into the path of the lower frequency signal. The signal due to this lower sideband frequency flows through the saturable reactor and causes energy to be abstracted from the higher frequency source signal and delivered to the lower frequency signal generated by the excited lower frequency resonant circuit.

In order to generate desired subharmonics, a definite relation must exist between the signal frequencies. This relation is expressed by the equation:

$$f_3 = mf_1 \pm nf_2 \qquad 1$$

where:
- $f_1$ is a signal frequency generated by the driving source;
- $f_2$ is a signal frequency generated by a resonance in the circuit;
- $f_3$ is a subharmonic resulting from a nonlinearity in the circuit; and
- $m$ and $n$ are integers.

In the equation the signal frequencies, or signals at frequency $f_3$, flow in a negative impedance path. If $f_1$ and $f_2$ are commensurable, subharmonics $f_3$ of the driving source signal are generated.

A typical practical circuit to generate such subharmonics comprises a plurality of resonant circuit paths. Generally, one circuit path is resonant to the frequency of the driving source and another circuit path is resonant to a subharmonic thereof, generally a sideband frequency. These resonant circuit paths include inductive and capacitive reactances and the signals excite a ferroresonant or saturable reactor in common with the two circuit paths.

A typical subharmonic frequency generator is disclosed in U.S. pat. No. 3,387,203, issued June 4, 1968, to J. J. Munnelly, and assigned to the same assignee as this application. The subharmonic generator disclosed therein comprises a driving source of 60 Hz, a first resonant or idler circuit including a saturable reactor and tuned to 100 Hz, and a second series resonant circuit tuned to 20 Hz. The various frequencies generated conform to the above-described equation (1) and at the output of the transformer a subharmonic signal of 20 Hz is provided. This circuit has two distinct magnetic components, a saturable reactor included in the idler circuit, and an inductance in the series resonant circuit which is included as part of the output transformer. The typical subharmonic type frequency divider of the prior art has required a plurality of magnetic components which tend to make the generator physically heavy and generally substantial in bulk.

An operating characteristic of prior art subharmonic frequency generators is their sensitivity to the amplitude and frequency of the driving source signal. It is a general requirement that the driving source signals must be within a definite, prescribed range of amplitude and frequency in order to maintain the precise frequency output of the generator. If the amplitude of the driving signals go beyond a certain limited range, the oscillations in the resonant circuits of the subharmonic generator fall to zero and the circuit ceases to operate. A small deviation in the frequency of the driving signal significantly changes the frequency of the output of this subharmonic generator. This is a distinct disadvantage particularly in circuits which operate in response to commercial alternating current power where substantial drops in voltage amplitude or brownouts occur.

It is also a serious limitation in subharmonic frequency generators driven by reserve power systems where the frequency may vary by as much as 10 percent.

SUMMARY OF THE INVENTION

It is therefore an object of the present invention to reduce the number of component parts and reduce the overall bulk of a subharmonic frequency generator.

It is another object of the invention to decrease the sensitivity of a subharmonic frequency generator to input voltage amplitude variations.

It is still another object of the invention to decrease the sensitivity of a subharmonic frequency generator to variations in the input frequency.

Accordingly, the invention is embodied in the utilization of a common magnetic core structure in a static electromagnetic type subharmonic frequency generator to provide the combined functions of a linear inductance, a saturating inductance, and a transformer coupling. A magnetic shunt located between the primary and secondary winding decouples sufficient flux generated by current in the primary winding from the secondary winding to cause the portion of the magnetic core embraced by the primary winding to saturate during each cycle of the applied AC signal and, in addition, introduce a specific linear inductance into the primary circuit. These inductances are combined with first and second capacitors resonant with the inductance at a given frequency and a subharmonic or multiple thereof, respectively.

A feedback winding embodied as an autotransformer winding with a primary winding is separated from the primary by the magnetic shunts and closely magnetically coupled to the secondary winding. This feedback winding is connected in series with the input to the frequency generator and is included therein to render the frequency generator relatively insensitive to frequency and amplitude variations in the applied input signal.

An advantageous feature of the foregoing invention is that, by judicious selection of resonant frequencies in the circuit, the circuit is self-starting and is also capable of generating even subharmonics without the necessity of a DC bias signal.

BRIEF DESCRIPTION OF THE DRAWING

The invention may be understood by referring to the foregoing description and the accompanying drawings wherein.

DETAILED DESCRIPTION

Figure 1:
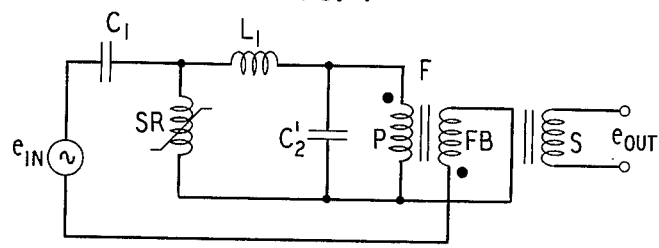
FIG. 1 is a schematic of an equivalent circuit of a subharmonic generator embodying the principles of the invention.

The schematic in FIG. 1 is an equivalent circuit of a subharmonic generator embodying the principles of the invention. The subharmonic generator is energized by an AC sinusoidal source designated $e_{in}$ which may comprise a commercial AC power source or some other source of sinusoidal voltage waves. The subharmonic frequency generator includes a plurality of reactances including the linear capacitors $C_1$ and $C_2'$, $C_2'$ being equivalent to $C_2$ in FIG. 2, and the linear inductance $L_1$. A saturable reactor SR is connected to be energized by the sinusoidal voltage source $e_{in}$. A primary winding P of an ideal transformer F is connected to shunt the capacitor $C_2'$. A subharmonic output signal is taken from the secondary winding S. A feedback winding FB is included to feed back part of the output signal in series with the signal supplied by the driving sinusoidal source $e_{in}$. The reactance components are arranged into resonant circuits to provide the necessary sideband frequencies required for subharmonic operation.

Capacitor $C_1$ and the inductance $L_1$ comprise a first resonant circuit. The saturable reactor SR, the inductor $L_1$, and capacitor $C_2'$ form a second resonant circuit. In a particular embodiment of the invention the input driving source $e_{in}$ is considered to be a sinusoidal source of 60 Hz. The first resonant circuit comprising capacitor $C_1$ and inductance $L_1$ is tuned to be resonant at a frequency of 60 Hz. The second resonant circuit comprising the saturable reactor SR, the linear inductance $L_1$, and capacitor $C_2'$ is tuned to be resonant at 20 Hz. It is apparent that these oscillations meet the criteria necessary to generate subharmonics as defined by the above equation (1) wherein:

$$20 = (1)(60) - 2(20). \tag{2}$$

As described hereinabove, subharmonic frequency generators of the prior art cease operating if the amplitude and frequency of the driving source signal deviate from a narrowly defined range. For example, if the driving source amplitude drops, the circuit may cease operation or significant changes may occur in the frequency of the output signal. In addition, if the input frequency of the driving source should vary significantly, this change is reflected by a significant change in the frequency of the subharmonic output signal. This is critical if the subharmonic generator is to be powered by commercial AC where the condition of brownout is a frequent occurrence. To counter these characteristics, a feedback winding FB is magnetically coupled to output winding S and is electrically coupled in series with the driving source $e_{in}$ and saturable reactor SR. It is designed to couple a fraction of the output signal phase shifted by 180° in series with the input signal.

In operation, a 60 Hz sinusoidal voltage signal is applied by the driving source $e_{in}$ to the circuit. Due to the nonlinear characteristics of the saturable reactor SR, a plurality of sum and difference frequency signals are produced. The 60 Hz driving sinusoidal signal $e_{in}$ excites the first resonant circuit including capacitor $C_1$ and inductance $L_1$ to produce a 20 Hz signal which, according to the defined quantities, is a lower sideband frequency produced by the modulating saturable reactance SR. The nonlinear action of the saturable reactor SR permits energy from the 60 Hz driving source $e_{in}$ to be transferred from the source to the output 20 Hz subharmonic signal.

A 20 Hz signal 180° out of phase with the 20 subharmonic output signal is fed back and applied in series with the 60 Hz driving source signal. The action of this feedback signal has been discovered to enhance hysteretic action. This means that once the driving source signal has reached an amplitude sufficient to institute subharmonic generation, a drop in the amplitude below that necessary for starting will not cause the circuit to shut down. Once the circuit is operating, this hysteretic effect counters the deleterious effects of brownout and keeps the subharmonic generator operating.

The frequency of the feedback signal and the amplitude of the feedback voltage also counteract voltage variations in the circuit which would normally occur due to changes in the input frequency. Due to the resonant nature of the subharmonic generator, a slight change in frequency of the driving signal results in significant changes in signal amplitudes occurring throughout the subharmonic generator. The action of the feedback signal counteracts these amplitude changes and sustains the oscillations at their proper amplitude level thereby maintaining the desired frequency of the subharmonic output signal. Hence, it is apparent that this circuit is capable of operation over a wider frequency and amplitude range of driving source signal than has been possible in prior art circuits.

Figure 2:
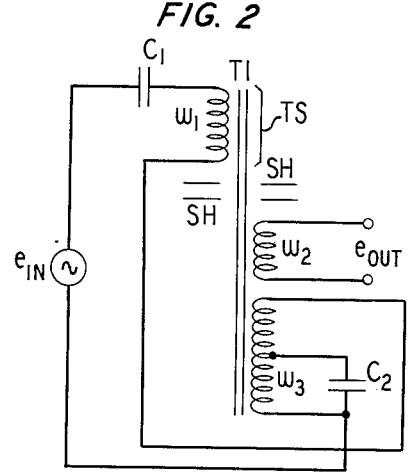
FIG. 2 is an electrical schematic of a subharmonic generator embodying the principles of the invention.

A particular electrical schematic of a subharmonic generator corresponding to the schematic of FIG. 1 and embodying the principles of the invention is shown in FIG. 2. Similar circuit components retain the same reference character designations. Capacitor $C_2'$ is an equivalent of capacitor $C_2$. The sinusoidal driving voltage source $e_{in}$ is coupled by a capacitor $C_1$ to a primary transformer winding $W_1$ of transformer $T_1$. The transformer $T_1$ includes the output winding $W_2$ and a feedback winding $W_3$ is connected in series as an autotransformer with the primary winding $W_1$. A second capacitor $C_2$ shunts a portion of the feedback winding $W_3$. The primary winding $W_1$ is separated from the output winding $W_2$ and the feedback winding $W_3$ by a magnetic shunt SH. A portion of the core of transformer $T_1$, which is encompassed by the primary winding $W_1$, is designed with a cross-sectional area so that it saturates with each half cycle of the applied driving voltage signal. The shunts SH which separate the primary winding $W_1$ from the secondary winding $W_2$ and feedback winding $W_3$ induce sufficient leakage reactance to provide the necessary linear inductance for the circuit, which is shown as inductance $L_1$ in FIG. 1. These shunts also divert sufficient flux so that the portion of the transformer core $T_1$ common to the windings $W_2$ and $W_3$ remains in its linear range of operation.

It is apparent from an examination of FIG. 2 that the equivalent circuit shown in FIG. 1 advantageously permits inclusion of the saturable reactor, the linear inductance, and the primary winding to be embodied in one winding encompassing one magnetic structure as is accomplished in FIG. 2. In operation, a 60 Hz sinusoidal signal is provided by the driving source $e_{in}$ and is applied to the primary winding $W_1$ causing the portion of the core of transformer $T_1$ encompassed by winding $W_1$ to saturate in each half cycle of operation. The capacitances $C_1$ and $C_2$ and the linear inductance provided by the shunt SH supply the two resonant circuits to provide the necessary oscillations within the circuit to produce the subharmonic frequency. The nonlinear reactance due to the saturation of the core encompassed by the primary winding $W_1$ acts as a mixer or modulator producing the necessary sum and sideband frequencies. These frequencies excite the 60 Hz and 20 Hz resonant circuits and a signal of 20 Hz appears across the output winding $W_2$. The autotransformer feedback winding $W_3$ provides a subharmonic feedback signal in series with the driving source signal $e_{in}$ to re-enforce the generated subharmonic 20 Hz signal.

Figure 3:
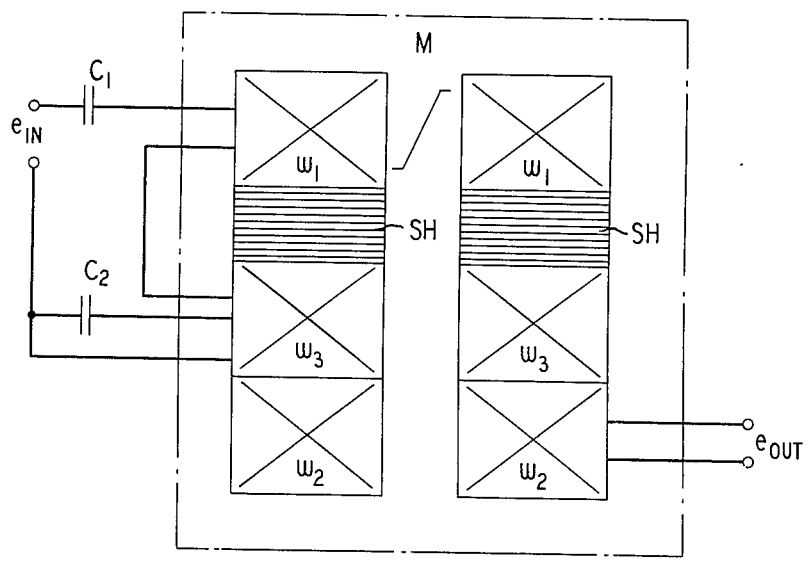
FIG. 3 is a structural view and part schematic of a subharmonic generator embodying the principles of the invention.

A particular structural embodiment of a subharmonic generator in accord with the invention is disclosed in FIG. 3. A three-legged transformer which may be constructed of conventional E and I laminations comprises the single magnetic structure for the subharmonic generator. As is apparent from the structural diagram, the windings $W_1$, $W_2$, and $W_3$ are all wound around the central core and passed through the two windows of the transformer structure. Magnetic shunts SH separate winding $W_1$ from the windings $W_2$ and $W_3$.

As described above, the portion of the core encompassed by winding $W_1$ saturates during each half cycle while the portion of the core common to windings $W_2$ and $W_3$ remains within its linear range. The shunts SH divert sufficient leakage flux to provide the linear inductance required by the resonant circuits. The windings $W_1$ and $W_3$ are connected in series and energized by the driving source signal $e_{in}$. The subharmonic output signal is taken from the output winding $W_2$. It is apparent that this circuit utilizes a single magnetic structure to provide a plurality of functions and through the addition of the feedback winding provides a stability of subharmonic generator action not heretofore attained in the prior art.

A feature of the invention is that by appropriate selection of resonant circuit frequencies, the subharmonic generator will generate odd subharmonics and even subharmonics without the necessity of DC bias. To meet these requirements, it is necessary that the sum of the factors $m$ and $n$ as defined in the above equation (1) be an odd number.

Many various embodiments of the invention will be apparent to those skilled in the art without departing from the spirit and scope of the invention.

What is claimed is:

1. A subharmonic frequency generator comprising
   input means for accepting a signal of a given frequency,
   a transformer including a primary winding coupled to said input means, a secondary winding, and a magnetic core linking said primary and secondary windings,
   magnetic path means for diverting a portion of the flux generated in response to current in said primary winding from coupling with said secondary winding to derive a specific transformer inductance,
   said magnetic core designed to have a portion of the core encompassed by said primary winding saturate in response to said given signal, said magnetic shunts diverting sufficient flux from a portion of the core encompassed by said secondary winding to maintain operation therein within a linear range,
   a first resonant circuit tuned to a first selected frequency and including said primary winding,
   a second resonant circuit tuned to a second selected frequency and including said primary winding,
   the saturable part of said core producing harmonic and beat frequencies and said transformer inductance forming a linear inductance component common to said first and second resonant circuits.

2. A subharmonic frequency generator as defined in claim 1 further including a feedback winding closely coupled magnetically to said secondary winding and electrically coupling said input means to said first primary winding, said feedback winding magnetically oriented to supply a signal 180° out of phase with a signal on said secondary winding.

3. A subharmonic frequency generator connected to be energized by a signal of a given frequency and comprising a transformer including
   a magnetic core and a primary winding, a secondary winding magnetically coupled thereto, said core designed to saturate in the region encompassed by said primary winding in response to said given signal and produce harmonic and sideband frequency signals,
   magnetic path means to divert a portion of flux generated in response to current in said primary winding in order to maintain a portion of said magnetic core encompassed by said secondary winding in its linear region and to create a specific transformer inductance,
   a first capacitor and a second capacitor coupled to said primary winding, said first capacitor and said transformer inductance being resonant at said given frequency, and
   an inductance responsive to said saturating core and said transformer inductance and said second capacitor being resonant at a subharmonic of said given frequency.

4. A subharmonic frequency generator as defined in claim 3 further including a feedback winding closely coupled to said secondary winding and electrically coupled to said primary winding and oriented to apply a signal 180° out of phase with a signal at said secondary winding to said primary winding.

5. A subharmonic frequency generator comprising
   input means for accepting a signal of a given frequency,
   a transformer having a primary winding and a secondary winding,
   said transformer including a magnetic shunt located between said primary winding and said secondary winding,
   a first capacitor, a second capacitor,
   said first capacitor and said primary winding electrically connected in series circuit and coupled to said input means, said second capacitor coupled in series with said primary winding, said magnetic shunt operative to decouple sufficient flux generated by current in said primary winding to allow a portion of said transformer embraced by said primary winding to saturate during each cycle of said signal of a given frequency and to create a significant transformer inductance in said series circuit, said first capacitor and said transformer inductance being resonant at said given frequency, and said second capacitor, said transformer inductance, and an inductance responsive to saturation of a portion of said transformer embraced by said primary winding being resonant at a subharmonic of said given frequency.

6. A subharmonic frequency generator as defined in claim 5 further including a feedback winding electrically coupled in series with said primary winding and magnetically coupled to said secondary winding and being magnetically oriented to couple a portion of the subharmonic signal of said secondary winding into said series circuit, whereby a signal of said feedback winding counters the frequency generator response to frequency and amplitude variants of said signal of a given frequency.

7. A subharmonic frequency generator comprising input means for accepting a signal of a given frequency, a transformer having a primary winding, a feedback winding, and a secondary winding, said transformer including a magnetic shunt located between said primary winding and said feedback and secondary windings, a first capacitor, a second capacitor, said first capacitor, said primary winding, and said feedback winding electrically connected in series circuit and coupled to said input means, said feedback winding being magnetically oriented to degeneratively couple a portion of a signal of said secondary winding into said series circuit, said second capacitor shunting at least a portion of said feedback winding, said magnetic shunt operative to decouple sufficient flux generated by current in said primary winding to allow a portion of said transformer embraced by said primary winding to saturate during each cycle of said signal of a given frequency and to create a significant transformer inductance in said series circuit, said first capacitor and said transformer inductance being resonant at said given frequency, said second capacitor, said transformer inductance and an inductance responsive to saturation of a portion of a transformer embraced by said primary winding being resonant at a subharmonic of said given frequency, whereby said feedback winding counters the frequency generator response to frequency and amplitude variations of said signal of a given frequency.

8. A subharmonic frequency generator as defined in claim 7 wherein said transformer comprises a plurality of stacked E and I laminations, said primary, secondary and feedback windings being wound about a central leg and said magnetic shunts creating a magnetic path between the central leg and the two outer legs.

9. A subharmonic frequency generator comprising input means for accepting a signal of a given frequency, a transformer having a primary winding, a secondary winding, and a magnetic core common to said primary and secondary windings, said transformer including a magnetic shunt located between said primary winding and said secondary winding, a first capacitor, a second capacitor, said first capacitor and said primary winding electrically connected in series circuit and coupled to said input means, said magnetic shunt operative to decouple sufficient flux generated by current in said primary winding from said secondary winding to create a significant transformer inductance in said series circuit, a portion of said magnetic core embraced by said primary winding designed to saturate during each cycle of said signal of a given frequency, said magnetic shunt operative to decouple sufficient flux from said secondary winding to allow said secondary winding to operate in its linear range, said second capacitor magnetically coupled to electrically interact with said transformer inductance created by said magnetic shunt, said first capacitor and said transformer inductance being resonant at said given frequency, said second capacitor, said transformer inductance and an inductance responsive to saturation of a portion of said magnetic core embraced by said primary winding being resonant at a subharmonic of said given frequency, whereby said signal of a given frequency applied to said input means is converted to an output signal of a subharmonic frequency at said secondary winding.

10. A subharmonic frequency generator as defined in claim 9 further including a feedback winding magnetically coupled to said secondary winding and electrically coupled in series with said primary winding.

* * * * *